United States Patent [19]

Hines

[11] Patent Number: 4,765,145
[45] Date of Patent: Aug. 23, 1988

[54] CONNECTOR ASSEMBLY

[75] Inventor: Barrett D. Hines, Canoga Park, Calif.

[73] Assignee: Rockwell International Corporation, El Segundo, Calif.

[21] Appl. No.: 4,521

[22] Filed: Jan. 20, 1987

[51] Int. Cl.4 ............................. F02K 9/42; F02K 9/60
[52] U.S. Cl. ....................................... 60/757; 285/317; 285/320; 285/39; 403/335
[58] Field of Search ............... 285/317, 320, 921, 302, 285/39; 403/338, 342, 335; 60/257

[56] References Cited

U.S. PATENT DOCUMENTS

| 4,159,131 | 6/1979 | Hüttlin | 285/317 |
| 4,327,770 | 5/1982 | Brown et al. | 137/614.05 |
| 4,376,592 | 3/1983 | Martinek | 403/26 |
| 4,543,074 | 9/1985 | Ville et al. | 464/33 |
| 4,575,274 | 3/1986 | Hayward | 403/2 |
| 4,587,786 | 5/1986 | Woods | 52/638 |
| 4,609,004 | 9/1986 | Greene et al. | 137/38 |
| 4,613,112 | 9/1986 | Phlipot et al. | 285/317 |
| 4,660,803 | 4/1987 | Johnston et al. | 285/921 |

Primary Examiner—Donald E. Stout
Attorney, Agent, or Firm—H. Fredrick Hamann; Harry B. Field; David C. Faulkner

[57] ABSTRACT

A connector assembly 10 is described which permits high pressure connection joints for either high temperature or cryogenic fluid conduits. The assembly 10 comprises in combination a translating carriage 20, a mandrel 50 and a tubular member 70, all including associated functional elements.

20 Claims, 4 Drawing Sheets

CONNECTOR ASSEMBLY

STATEMENT OF GOVERNMENT INTEREST

The invention described herein was made in the performance of work under Contract No. NAS3-23773 and is subject to the provisions of Section 305 of the National Aeronautics and Space Act of 1958 (72 Stat. 435; 42 USC 2457).

BACKGROUND OF THE INVENTION

1. Field of the Invention

The present invention relates generally to a connector and, more particularly, to a locking connector. While the present invention will be described specifically with respect to a fluid delivery system, it will be appreciated that the invention is adaptable for use with other types of connectors, such as electrical connections or structural connections.

2. Background Art

The background art is replete with various connector assemblies for use as cable connectors, clutch connectors or connectors used in scaffolding, to name but a few.

For example, Hayward (U.S. Pat. No. 4,575,274) describes a connector assembly having two major normally separable components 10 and 12. Body portion 10 generally fabricated of an electrical conducting material is designed with threaded segments for receiving nut portion 12.

Ville et al (U.S. Pat. No. 4,543,074) describe a fangible device for coupling two rotary machines includes a first shaft 1 and a second shaft 2. The power transmission is effected by a dog-clutch connection 9 and 11 between shafts 1 and 2.

Woods (U.S. Pat. No. 4,587,786) relates to a locking disc D for use in scaffolding. Disc D form a plurality of components which include a plurality of base-plates 10 each provided with a vertically extending threaded shank 11 receiving a cooperating adjustment nut 12. A plurality of ledgers and/or transoms 15, opposite ends of which each have a slot 16, are also provided in each of these slots and is adapted to receive a portion of a locking disc D.

BRIEF SUMMARY AND OBJECTS OF THE INVENTION

The connector assembly of the present invention is designed to ensure a safe and reliable means of joining mating halves particulary in limited access locations or hostile environments.

According to a principle aspect of the present invention, there is provided a locking connector which has a captive feature for engaging and retaining a connecting member. The connector assembly includes a translating carriage in functional association with a mandrel arrangement. Functioning of the mandrel arrangement serves to position the carriage for receiving and capturing a connecting member as well as locking and securing the connector assembly and connecting member.

It is, therefore, an object of this invention to provide a connector assembly including a minimum number of cooperating elements.

Another object of the present invention is to provide a connector assembly requiring sequential, rather than multiple and complex, actuation steps which is simple and reliable in use.

These and other objects and features of the present invention will be apparent from the following detailed description, taken with reference to the accompanying drawings.

DETAILED DESCRIPTION OF THE INVENTION

Figures 1, 2, 3:
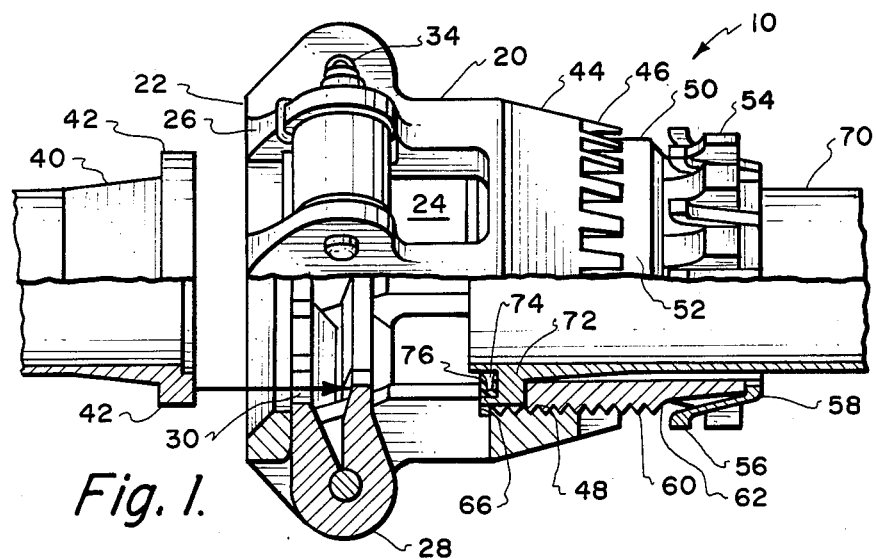
FIGS. 1-3 depict the sequential engagement and mating of the connector assembly and a connecting member.
Figure 4:
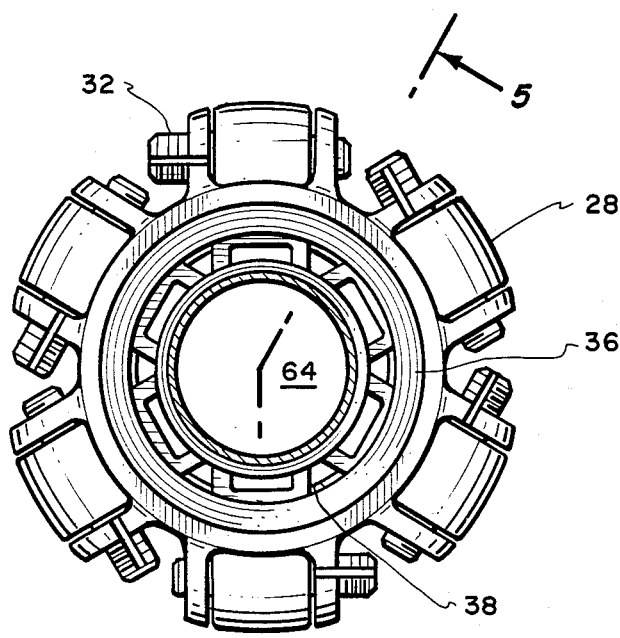
FIG. 4 is a frontal view of the connector assembly of the present invention taken along 4—4 of FIG. 7.
Figure 5:
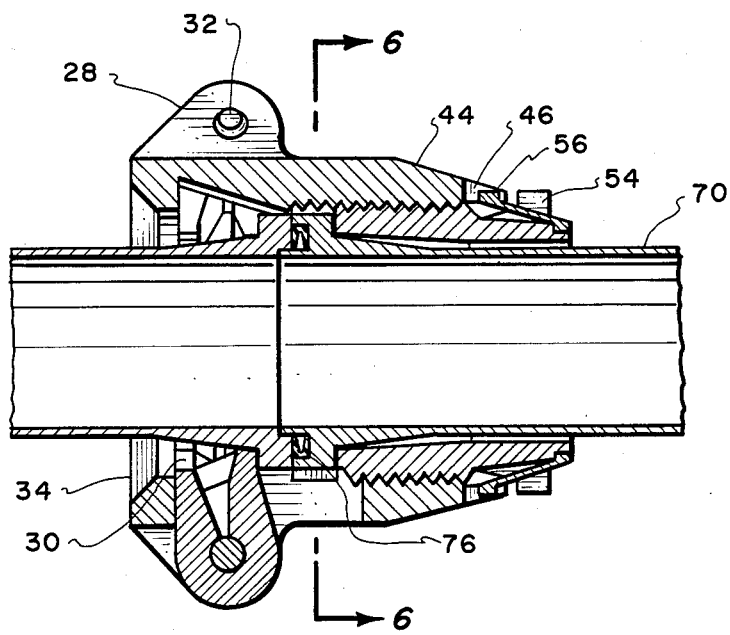
FIG. 5 is a cross-sectional view of the invention engaged and mated to a connecting member taken along line 5—5 of FIG. 4.

Reference is first made to FIGS. 1-3 of the drawings which illustrate the preferred embodiment of the present invention. The connector assembly 10 comprises a translating carriage 20, a mandrel 50 and a tubular member 70. In this embodiment of the invention, the generally conically shaped hollow body of carriage 20 includes a forward end 22 with a plurality of slots 24 formed integrally therein. On opposing sides of each slot 24 are raised retaining collars 26 of unitary construction with carriage 20. Rotatable horse-shoe shaped hooks 28, having engaging protrusions 30, are positioned within slots 24 and retained therein by retaining collars 26 in cooperating with retaining pivot pins 32 and spring 34. As best seen in FIG. 4, an integral retaining ring 36 provided at the forward end of carriage 20 defines an opening 38 for receiving connecting member 40 (see FIG. 1) having beveled edge or lip 42. Retaining ring 36 functions to impart the joint clamping forces from carriage 20 through the hooks 28 to the back side of lip 42 of connecting member 40 (see FIG. 5). In addition, retaining ring 36 resists and counters the radial force component or stresses acting on retaining collars 26, i.e., potential energy of hooks 28 due to force exerted through pins 32. Without retaining ring 36, forward end 22 would tend to "bow out". The horse-shoe shape of hooks 28 cause them to act as stiff spring elements when loaded, thereby helping to accommodate machining tolerances and provide uniform loading around the back of lip 42.

Figure 6:
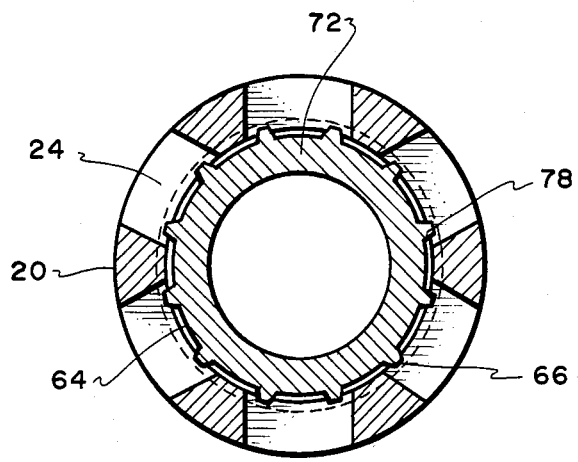
FIG. 6 is a cross-sectional view of the invention taken along line 6—6 of FIG. 5.

Opposite forward end 22 of carriage 20 is beveled or beveling skirt end 44. This terminus or end 44 defines a cylindrical ring of spaced locking tabs 46 and a spirally grooved inner surface 48, all of which further define an opening 64 for receipt of translating mandrel 50. Axial grooves 78 (see FIG. 6), cutting across the spiral grooves 48, are also provided along the inner surface of end 42 to permit receipt of the tubular member 70, as more fully described below.

Referring again to FIGS. 1 and 2, mandrel 50 defines a hollow tubular body 52 including a crenelated crown 54 having locking fingers 56 and base 58. Spiral grooves 60 are formed within outer surface 62 of body 52, and interact with grooved inner surface 48 of skirt end 42 on carriage 20, as explained more fully below. As noted, mandrel 50 defines a hollow tubular body 52 for receiving tubular member 70, which is provided with annular shoulder or rim 72, annular recess 74 housing pressure seal 76 and axial peripheral splines 66 formed on rim 72. Mandrel 50 carries the joint clamping forces between the carriage 20 and the back of rim 72 on tubular member 70 (see FIG. 5).

Preparatory to mating connector assembly 10 with connecting member 40, a removable clamshell type wrench 80 is positioned and tightened about crenelated crown 54 (see FIG. 3) which simultaneously compresses fingers 56. Interaction of the spiral grooves 60 on mandrel 50 with the spiral grooves 48 on carriage 20 effects an axial motion in carriage 20 causing it to open, moving away from mandrel 50. The interaction of axial grooves surfaces 78 with the axial splines 66 precludes rotation of carriage 20 while allowing the axial motion of carriage 20. Lip 42 enters opening 38 and exerts pressure against protrusions 30 of hooks 28 causing them to fold inwardly (see FIG. 2). As lip 42 passes by engaging protrusions 30, spring 34 cause hooks 28 to snap back to retaining ring 36 as shown in FIG. 3. This captures connecting member 40 as a prelude to final clamping.

Rotation of mandrel 50 is now occasioned in a counter-clockwise direction (see FIG. 3) which gradually draws member 40 inwardly into carriage 20 until lip 42 abuts pressure seal 76. Simultaneously, the spaced locking tabs 46 of end 44 of carriage 20 move over the compressed locking fingers 56 of mandrel 50. At this point connector assembly 10 and connecting member 38 (FIG. 4) are sealably engaged, and wrench 80 is removed, As wrench 80 is removed, the locking fingers 56 of mandrel 50 are released to engage the locking tabs 46 of end 44 of carriage 20, thereby locking the assembly by preventing rotation of mandrel 20.

Figure 7:
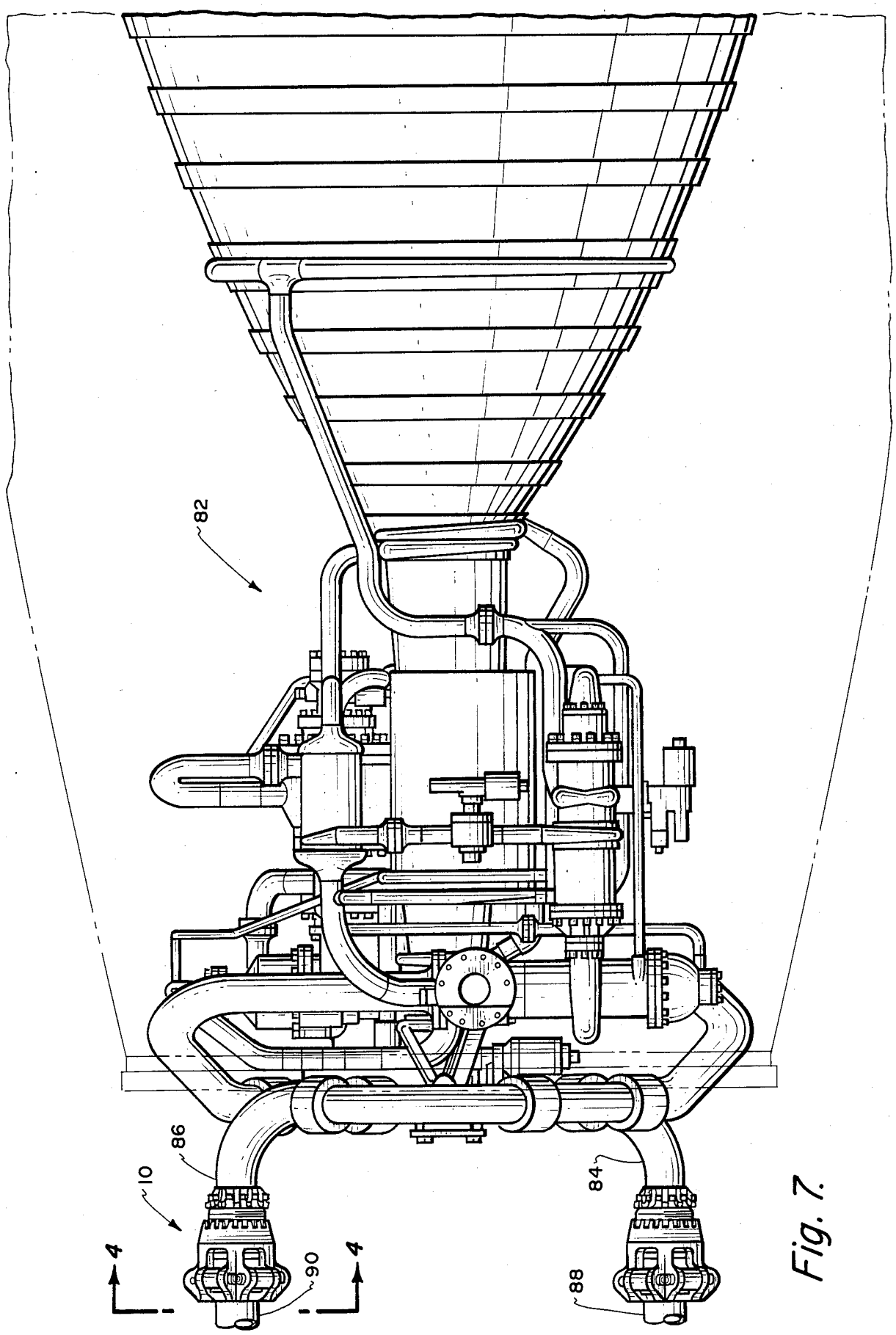
Fig.7 is a perspective view of the invention in cooperative engagement with fluid conduits serving a reaction or rocket engine.

For purposes of illustration, FIG. 7 is a prospective view of an orbital transfer vehicle rocket engine 82. Fuel inlet 84 and oxidizer inlet 86 are coupled to a fuel conduit 88 and oxidizer conduit 90 utilizing connector assemblies 10 according to the present invention. Conduits 88 and 90 would, of course, correspond to connecting member 40.

Should engine 82 need to be decoupled from conduits 88 and 90, wrench 80 would be placed about crown 54, thereby also depressing locking fingers 56 free of engagement with the locking tabs 46. Mandrel 50 is then rotated clockwise causing carriage 20 to translate to the open position. A clamshell sleeve tool (not shown) would then be placed about member 40 and then pushed along it to the right until it abuts the backside of lip 42. This action of the sleeve tool causes the hook 28 to pivot outward, to a position similar to that shown in FIG. 2, thereby freeing member 40 from capture. Member 40 and the sleeve tool would then be pulled out of opening 38 to complete the disconnect.

It will of course be realized that various modifications can be made in the design and operation of the present invention without departing from the spirit thereof. Thus, while principal, preferred construction, and mode of operation of the invention have been explained, it is to be understood that within the scope of the appended claims the invention may be practiced otherwise than as specifically illustrated and described.

What is claimed and desired to be secured by Letters Patent of the United States is:

1. In a connector assembly for coupling to a connecting member, which assembly comprises in combination:
   a translating carriage;
   a mandrel including means for translating the carriage axially;
   a tubular member retained within the assembly and extending therefrom;
   means precluding carriage rotation during translation; and
   means for locking and securing the connector assembly and the connecting member.

2. A connector assembly as in claim 1 in which the translating carriage further comprises:
   a generally conical body with a forward end and a beveling skirt;
   a plurality of slots in the conical body at the forward end opposing the skirt end;
   raised retaining collars integral to the body and positioned on opposite sides of the slots;
   rotatable hooks positioned within the slots and retained therein by the retaining collars in cooperation with retaining pivot pins;
   a retaining ring at the forward end of the body; and
   an opening in the forward end of the body for receiving a connecting member.

3. A connector assembly as in claim 1 in which the mandrel further comprises:
   a hollow tubular body including a crenelated crown and a base;
   locking fingers in the crown; and
   annular grooves within an outer surface of the base.

4. A connector assembly as in claim 1 in which the tubular member further includes an annular recess retaining a pressure seal.

5. A connector assembly as in claim 1 in which the means for precluding carriage rotation during translation comprises axial peripheral grooves on a shoulder of the tubular member which is seated adjacent mating axial groove surfaces of the carriage.

6. A connector assembly as in claim 1 in which the means for securing the connector assembly and connecting member comprises:
   body portion engaging surfaces of the carriage, mandrel and tubular member which compressively grip an annular lip of the connecting member.

7. A connector assembly as in claim 2 in which the beveling skirt end of the conical body includes:
   a terminus forming an opening in the skirt end for receiving the mandrel;
   a cylindrical ring of spaced locking tabs; and
   a grooved inner surface.

8. A fluid delivery system including a connector assembly for coupling to a fluid delivering connecting member, which assembly comprises in combination:
   a translating carriage;
   a mandrel including means for translating the carriage axially;
   a tubular member retained within the assembly and extending therefrom;
   means precluding carriage rotation during translation; and
   means for locking and securing the connector assembly and the connecting member.

9. A fluid delivery system as in claim 8 in which the translating carriage further comprises:
   a generally conical body with a forward end and a beveling skirt;
   a plurality of slots in the conical body at the forward end opposing the skirt end;
   raised retaining collars integral to the body and positioned on opposite sides of the slots;

rotatable hooks positioned within the slots and retained therein by the retaining collars in cooperation with retaining pivot pins;

a retaining ring at the forward end of the body; and an opening in the forward end of the body for receiving a connecting member.

10. A connector assembly as in claim 8 in which the mandrel further comprises:

a hollow tubular body including a crenelated crown and a base;

locking fingers in the crown; and annular grooves within an outer surface of the base.

11. A connector assembly as in claim 8 in which the tubular member further includes an annular recess retaining a pressure seal.

12. A connector assembly as in claim 8 in which the means for precluding carriage rotation during translation comprises annular peripheral grooves on a shoulder of the tubular member which is seated adjacent mating annular groove surfaces of the carriage.

13. A connector assembly as in claim 8 in which the means for securing the connector assembly and connecting member comprises:

body portion engaging surfaces of the carriage, mandrel and tubular member which compressively grip an annular lip of the connecting member.

14. A connector assembly as in claim 8 in which the beveling skirt end of the conical body includes:

a terminus forming an opening in the skirt end for receiving the mandrel;

a cylindrical ring of spaced locking tabs; and a grooved inner surface.

15. A rocket engine having a fuel inlet and an oxidizer inlet including a connector assembly for coupling each inlet to a connecting member associated with a fuel conduit and an oxidizer conduit, which connector assembly comprises in combination:

a generally conical body with a forward end and a beveling skirt;

a plurality of slots in the conical body at the forward end opposing the skirt end;

raised retaining collars integral to the body and positioned on opposite sides of the slots;

rotatable hooks positioned within the slots and retained therein by the retaining collars in cooperation with retaining pivot pins;

a retaining ring at the forward end of the body; and an opening in the forward end of the body for receiving a connecting member.

16. A rocket engine as in claim 15 in which the connector assembly mandrel further comprises:

a hollow tubular body including a crenelated crown and a base;

locking fingers in the crown; and annular grooves within an outer surface of the base.

17. A rocket engine as in claim 15 in which the connector assembly tubular member further includes an annular recess retaining a pressure seal.

18. A rocket engine as in claim 15 in which the connector assembly means for precluding carriage rotation during translation comprises annular peripheral grooves on a shoulder of the tubular member which is seated adjacent mating annular groove surfaces of the carriage.

19. A rocket engine as in claim 15 in which the connector assembly means for securing the connector assembly and connecting member comprises:

body portion engaging surfaces of the carriage, mandrel and tubular member which compressively grip an annular lip of the connecting member.

20. A rocket engine as in claim 15 in which the beveling skirt end of the connector assembly conical body includes:

a terminus forming an opening in the skirt end for receiving the mandrel;

a cylindrical ring of spaced locking tabs; and a grooved inner surface.

* * * * *